(12) United States Patent
Leal

(10) Patent No.: US 9,803,459 B1
(45) Date of Patent: Oct. 31, 2017

(54) TEMPORARY PRODUCTION SYSTEM AND SEPARATOR WITH VAPOR RECOVERY FUNCTION

(71) Applicant: Pros, Incorporated, Bakersfield, CA (US)

(72) Inventor: James E Leal, Bakersfield, CA (US)

(73) Assignee: Pros, Incorporated, Bakersfield, CA (US)

( * ) Notice: Subject to any disclaimer, the term of this patent is extended or adjusted under 35 U.S.C. 154(b) by 755 days.

(21) Appl. No.: 14/089,288

(22) Filed: Nov. 25, 2013

(51) Int. Cl.
*E21B 43/34* (2006.01)

(52) U.S. Cl.
CPC .................................. *E21B 43/34* (2013.01)

(58) Field of Classification Search
CPC .......... E21B 43/34; E21B 43/36; E21B 43/38; E21B 43/385; E21B 43/40
See application file for complete search history.

(56) References Cited

U.S. PATENT DOCUMENTS

| | | | | |
|---|---|---|---|---|
| 2,155,854 A | * | 4/1939 | Barnes | C23G 1/36 134/10 |
| 2,848,353 A | * | 8/1958 | Norris | B05B 15/1233 118/314 |
| 6,328,118 B1 | * | 12/2001 | Karigan | B01D 21/10 175/206 |
| 8,152,911 B1 | * | 4/2012 | Williams | E21B 43/34 95/248 |
| 9,187,996 B1 | * | 11/2015 | Nevison | E21B 43/34 |
| 2006/0070735 A1 | * | 4/2006 | Guerra | E21B 43/34 166/267 |
| 2012/0215365 A1 | * | 8/2012 | Nath | E21B 43/34 700/282 |
| 2014/0209465 A1 | * | 7/2014 | Whitney | C10G 33/06 204/555 |

* cited by examiner

*Primary Examiner* — Wei Wang
(74) *Attorney, Agent, or Firm* — James M. Duncan, Esq.; Klein DeNatale Goldner

(57) ABSTRACT

A temporary hydrocarbon well production system receives flow from a hydrocarbon well through a production line connected to the well. The production line flows into a sand separator, which has a fluid outlet connected to a choke manifold and a solids outlet connected to a sand dump line. A transportable and vertical closed separator receives flow through two separate lines from the choke manifold and from the sand dump line, which respectively flow into independent diffusing structures in the closed separator. Gas, vapors, volatile organic compounds, etc. are captured within the closed vessel and are discharged through a vapor discharge line attached to a vapor recovery unit for either further processing or incineration through a flare. A liquid dump line discharges liquids from the closed separator to at least one closed tank.

22 Claims, 16 Drawing Sheets

TEMPORARY PRODUCTION SYSTEM AND SEPARATOR WITH VAPOR RECOVERY FUNCTION

BACKGROUND OF THE INVENTION

This application relates to separators utilized for separating fluids produced from hydrocarbon wells, specifically to separators utilized for separating fluids produced from a hydrocarbon well during the flowback of drilling and stimulation fluids which are produced during the initial testing of a producing zone or following completion, re-completion, workover, or stimulation. Because this type of production frequently occurs with a drilling rig or work-over rig still on the well location, the well location is typically crowded with the rig and associated components, tanks, pumps, logging units, cementing units, pump trucks, drill string components, casing components, support vehicles, and other equipment utilized in the drilling or work-over operation. Because of the large array of equipment which is typically moved in and out of the location, there may be little space available at the well location. This problem is further exacerbated on offshore platforms, drilling islands, piers, and other remote well locations where available space for equipment can be extremely limited.

The availability of space at the well location can be further complicated when the well is stimulated by hydraulic fracturing and/or acidizing. Hydraulic fracturing typically requires large volumes of liquids and sands or other solids utilized as "proppant" to maintain the hydraulically induced fractures in an "open" configuration. Acidizing typically requires large volumes of stimulation fluids, displacement fluid, and the associated pumping equipment. The liquids and solids required for these and other work-over procedures are typically delivered to the well location in tanker trucks, bulk transport trucks, pods, railcars, workboat, and other modes of transport. These pieces of equipment are typically large and can consume a significant amount of the available footprint at the location.

The fluids produced from a well which has been placed on production following drilling, work-over, and/or stimulation, such as by hydraulic fracturing, may contain a number of components which are difficult to manage on a crowded well location, such as a high concentration of solids, high gas production rates, and returned stimulation fluids, such as spent acid or frac fluids. Producing these initial fluids, solids, and spent stimulation fluids into a temporary production and gauging system is generally favored over production into the permanent production system, which may not even be an option given the well location.

Moreover, temporary production systems dedicated to a single well facilitates the acquisition of data regarding the volume and make-up of the initial fluid and solid components produced from the well which may assist in evaluating the well and producing reservoir.

In the current typical practice, after the produced fluids and solids are directed through a solids separator and two phase gas-liquid separator, the produced fluids and solids are produced into open top tanks. These tanks allow the release of any entrained volatile organic compounds into the atmosphere. The escape of these VOCs into the atmosphere is undesirable because of the escape of the pollutants. However, no practical and satisfactory solution for temporarily producing the solids and fluids from newly completed and stimulated wells has been developed. A necessary component for a temporary production system which solves this problem would be a portable separator which: (a) occupies a relatively limited amount of space of the well location; (b) efficiently separates oil, gas, and solids; (c) captures fugitive VOCs; (d) is relatively easy to transport to and from the location; and (e) is relatively easy to clean following the receipt of significant volumes of solids.

SUMMARY OF THE DISCLOSURE

The presently disclosed temporary hydrocarbon well production system and associated fluid separator provides a solution to the problem identified above. The disclosed system facilitates the temporary production of hydrocarbons following the drilling, completion, work-over and/or stimulation of a hydrocarbon well (including stimulation wells, such as wells for the injection of water, steam, $CO_2$, or wells utilized for other enhanced oil recovery methods). An embodiment of the temporary hydrocarbon well production system comprises a production line connected to a hydrocarbon well. The production line flows into a sand separator, which has a fluid outlet connected to a choke manifold and a solids outlet connected to a sand dump line. A closed separator receives flow through two separate lines from the choke manifold and from the sand dump line, which respectively flow into independent diffusing structures in the closed separator. These diffusing structures are capable of receiving high velocity solids-laden fluid. Any gas, vapors, volatile organic compounds, etc. which are entrained within either of the separate flow lines are captured within the closed vessel and discharged through a vapor discharge line attached to a vapor recovery unit for either further processing or incineration through a flare. A liquid dump line discharges liquids from the closed separator to at least one closed tank.

The separator, which is central to the disclosed system, is configured as a vertical closed vessel, which has an integral skid frame for facilitating transport by either truck, trail, or boat. The vertical configuration provides a reduced areal footprint. The closed top of the vessel allows the capture of any volatile organic compounds which are released as the fluid and solids are processed in the vessel. The separator contains internal structures for the receipt of high velocity solids-laden fluids. These fluids are received into two separate flow diffusers adjacent to the top of the vessel.

Embodiments of the separator are typically utilized on a temporary basis, such as for initial well clean up and testing. As a portable and temporary facility, embodiments of the disclosed apparatus may be utilized for initial flow testing of a newly drilled well or well which has been recompleted or stimulated with fracking or acid washing. The disclosed separator, apparatus, as a vertical vessel, is compact and presents a limited footprint. The separator is equipped with internal components which allow the introduction of high velocity solids laden fluids into the separator, as typical of a well placed on production following stimulation by hydraulic fracturing. The apparatus may also have exterior metering attached for immediate read-outs of produced volumes of oil, gas and water.

DETAILED DESCRIPTION OF THE EMBODIMENTS

The fluids produced by a newly drilled well, a re-drilled well, or a well which has been worked-over by perforating and/or stimulation may comprise fluids which are native to the hydrocarbon reservoir, such as oil, gas, condensates, water, and/or hydrocarbon-water emulsions. Entrained within the produced fluids may be solids such as formation sand and paraffin. However, particularly at start-up, in addition to native fluids and solids, the produced fluids may also comprise fluids and solids which were introduced into the well during the drilling and completion processes, with such fluids including drilling mud, completion fluids, spent acids solutions, and fracturing fluids, including solid propping materials introduced with those fluids such as sand, bauxite, etc.

Figure 1:
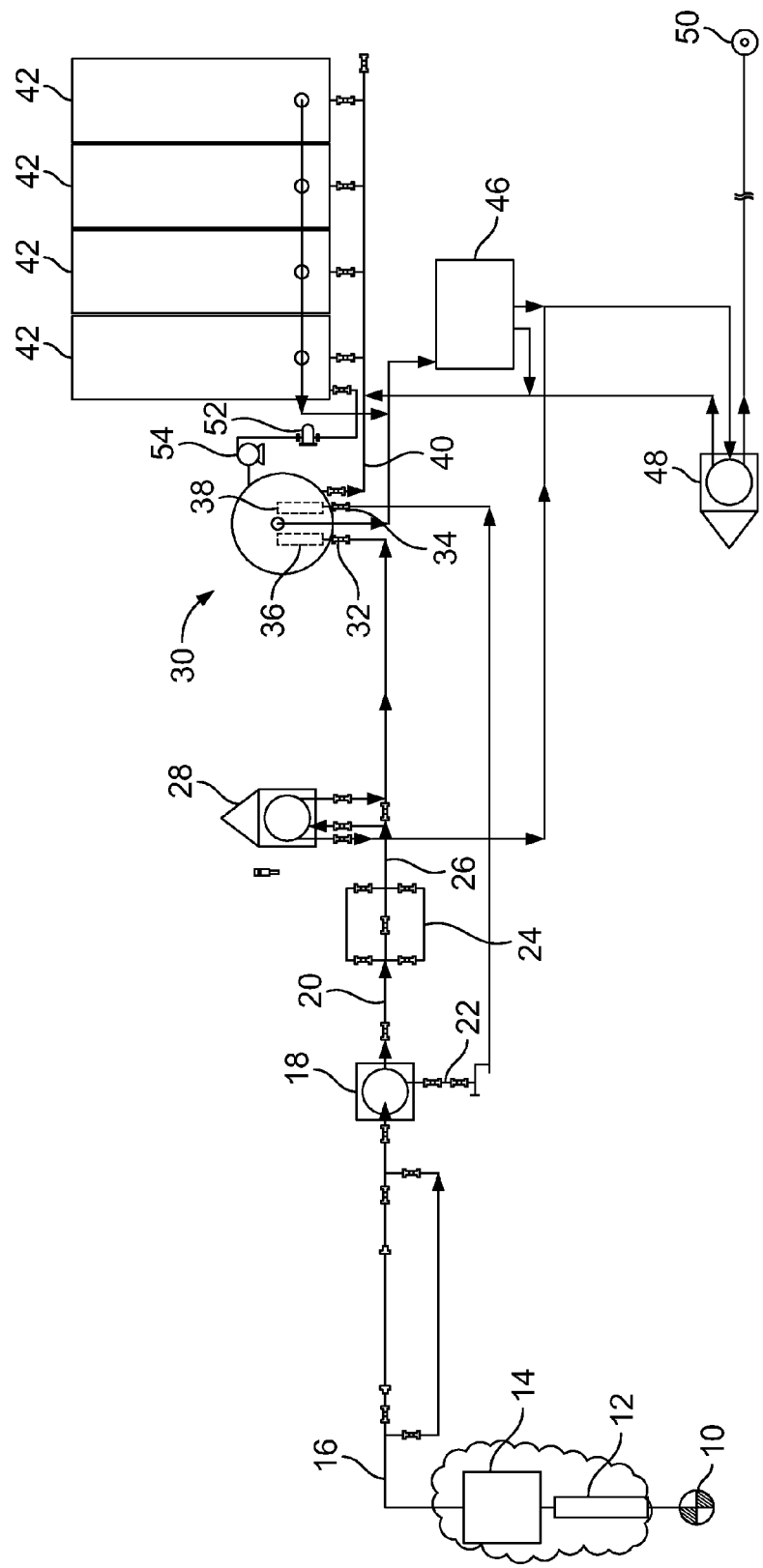
FIG. 1 schematically shows a flow diagram for an embodiment of the temporary hydrocarbon well production system of the present invention.
Figure 2A:
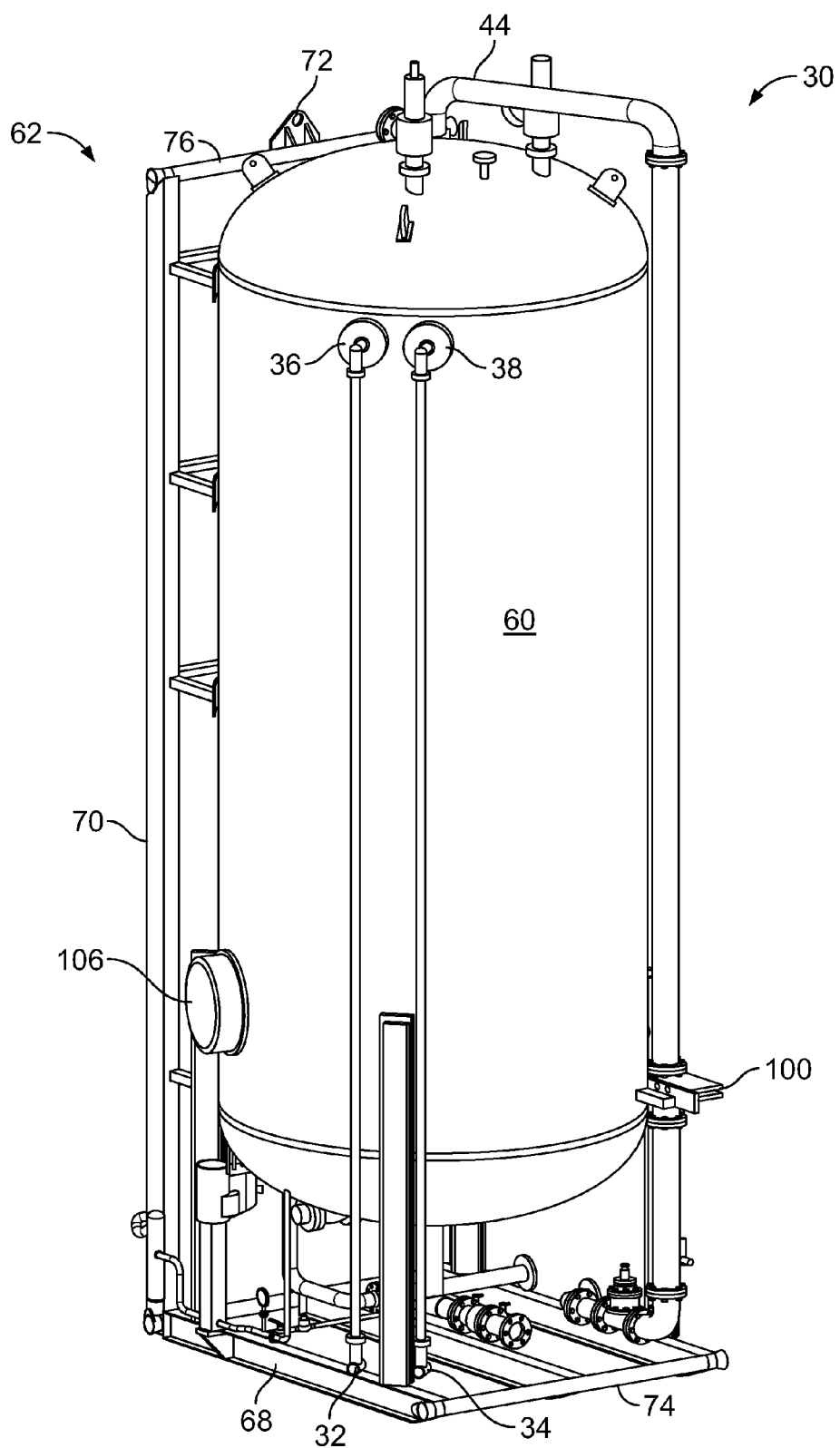
FIG. 2A shows a first perspective view of an embodiment of the closed vertical separator of the present invention.
Figure 2B:
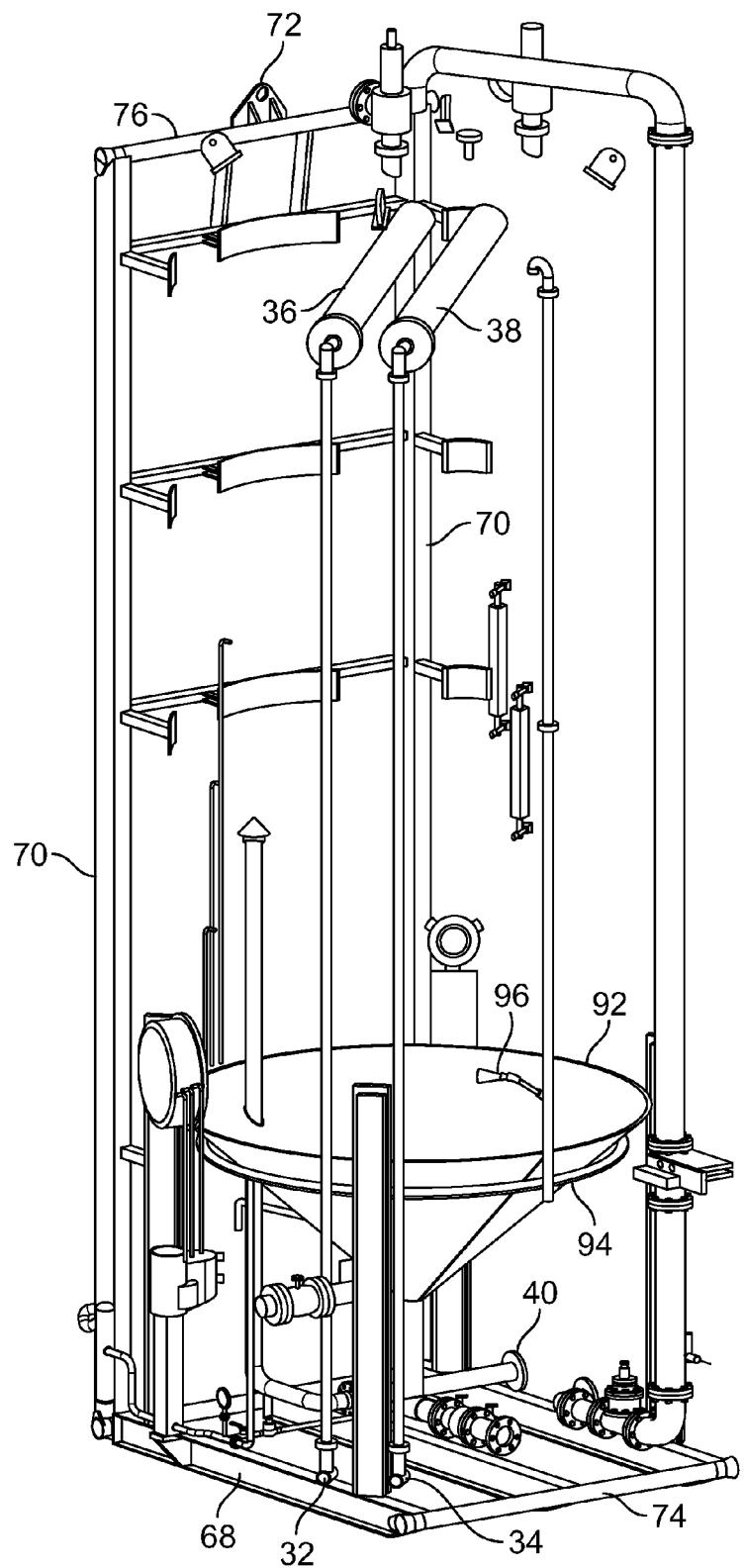
FIG. 2B shows the view of FIG. 2A, but with the vessel removed to show internal components, support structures, and attachments.
Figure 3A:
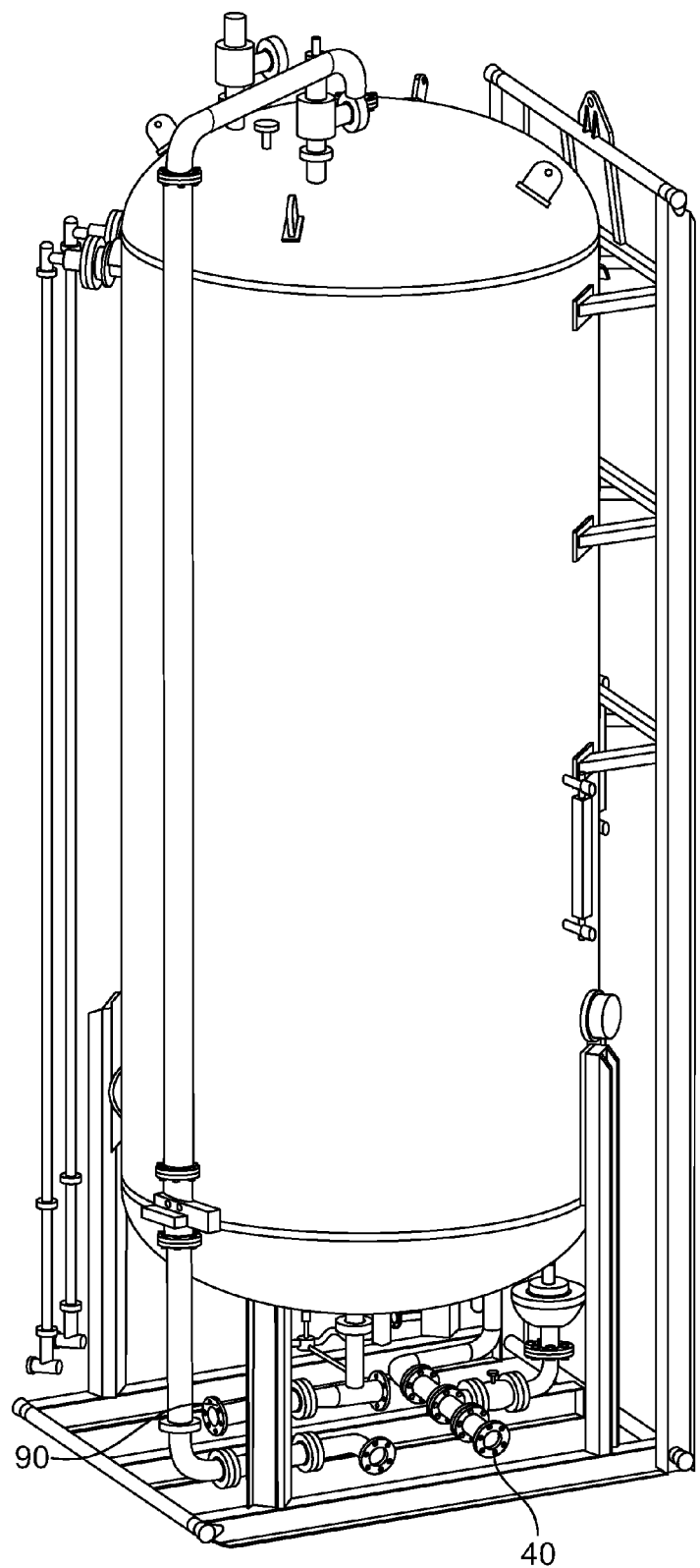
FIG. 3A shows a second perspective view of an embodiment of the closed vertical separator of the present invention.
Figure 3B:
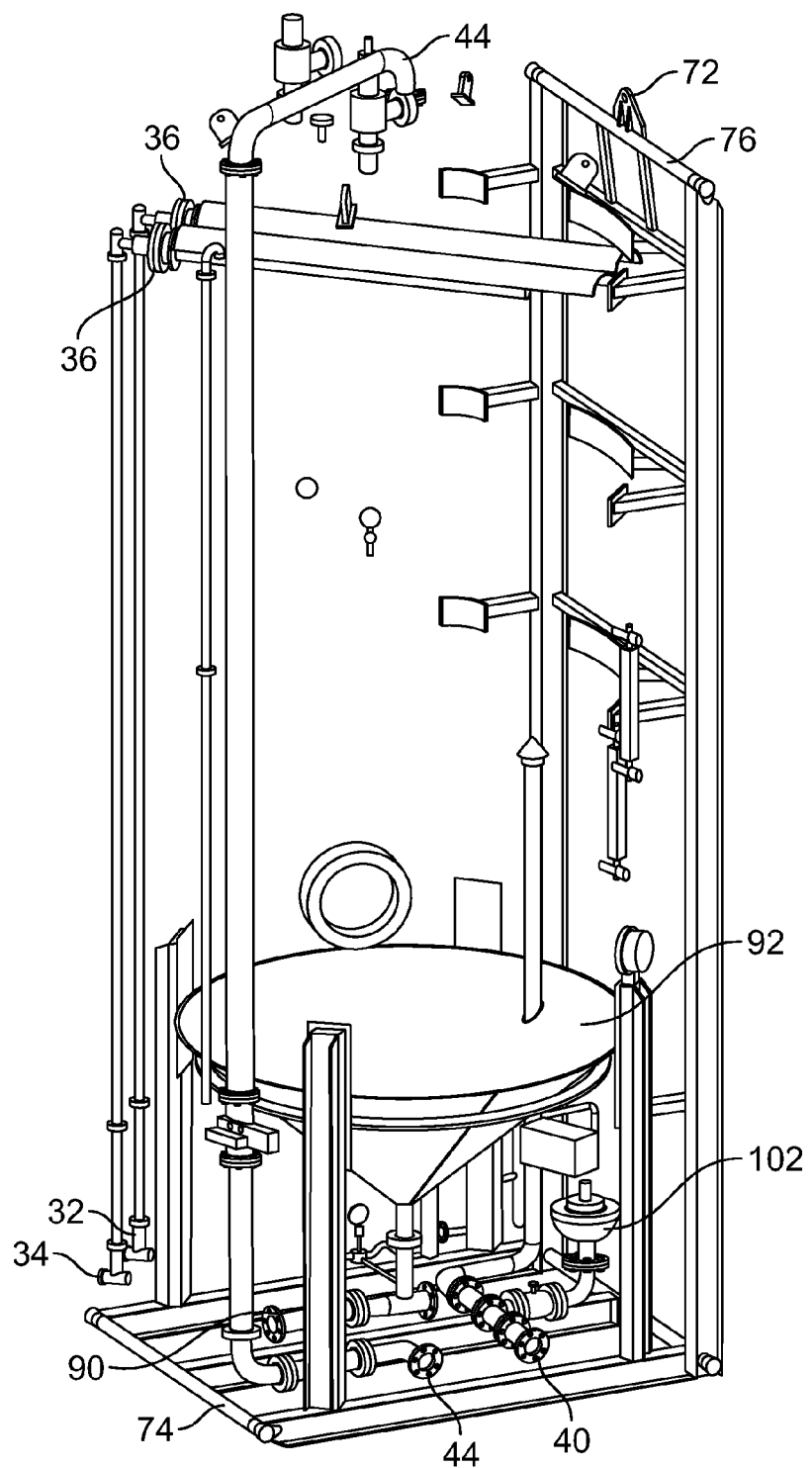
FIG. 3B shows the view of FIG. 3A, but with the vessel removed to show internal components, support structures, and attachments.
Figure 4A:
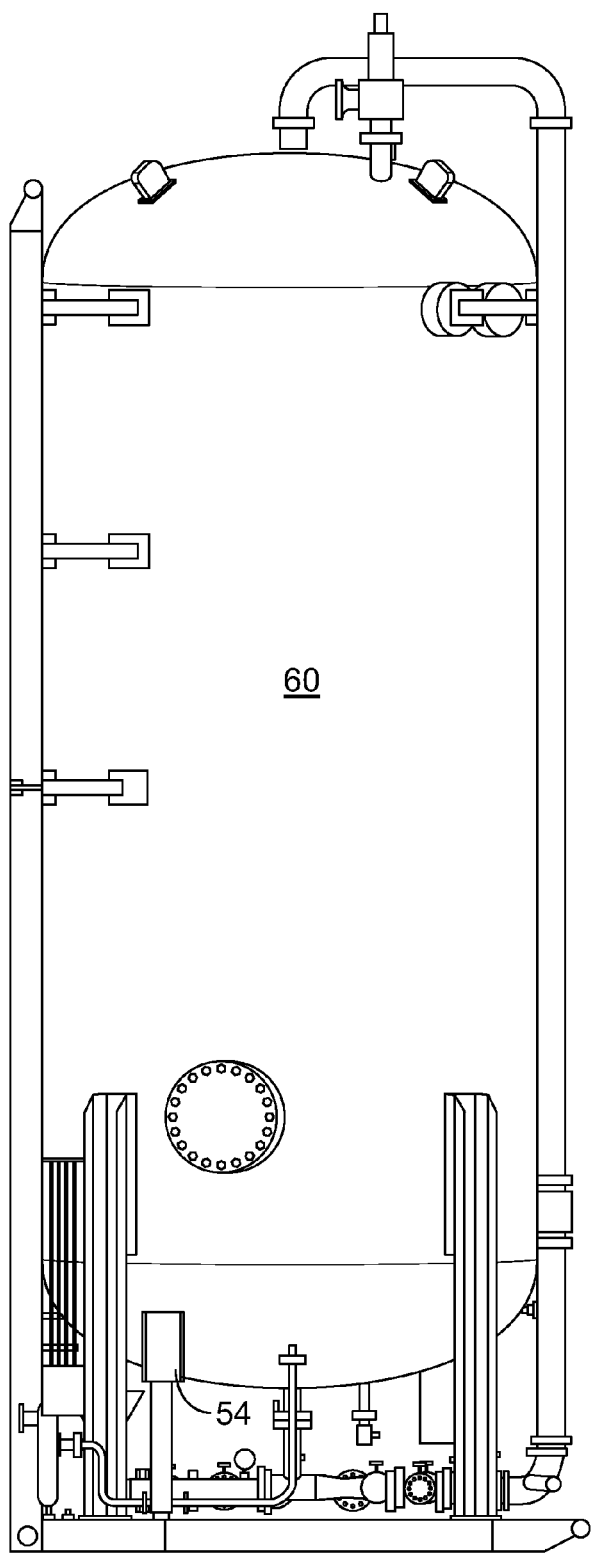
FIG. 4A shows a first side view of an embodiment of the closed vertical separator of the present invention.
Figure 4B:
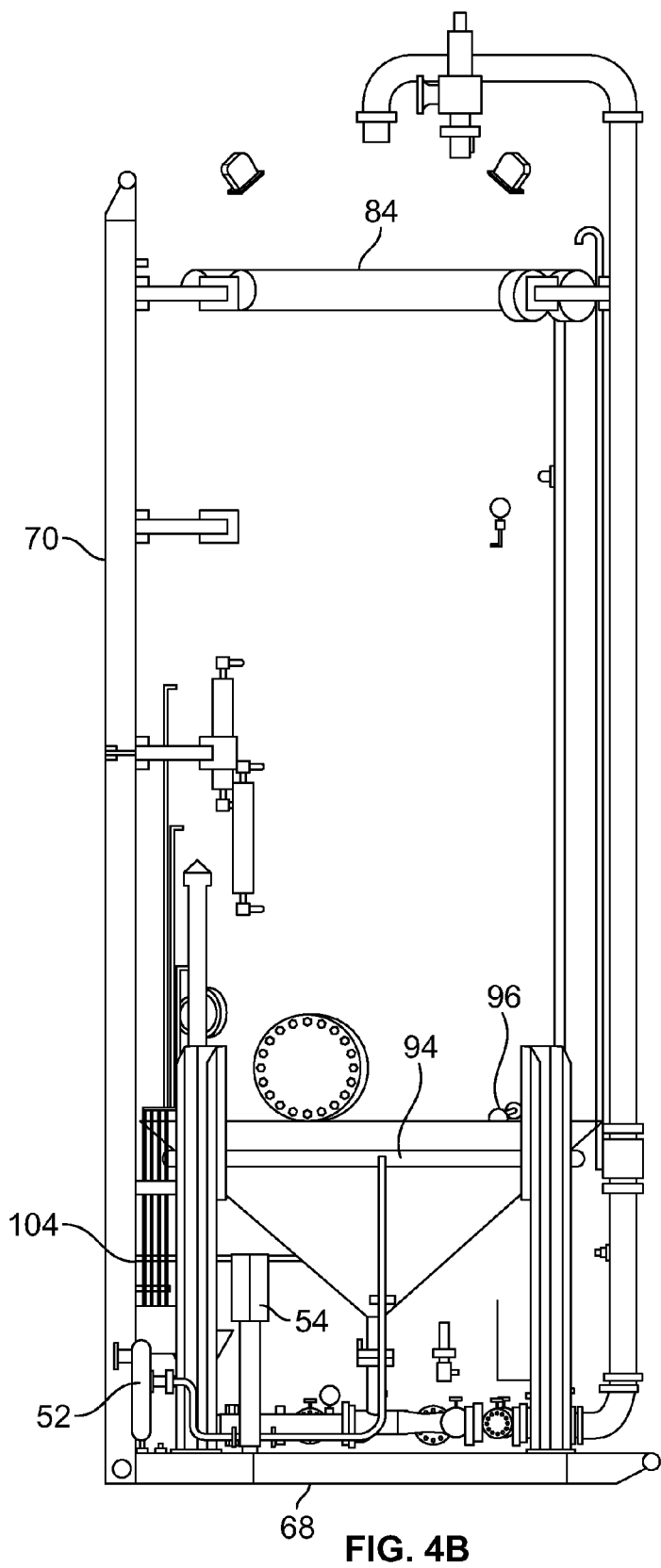
FIG. 4B shows the view of FIG. 4A, but with the vessel removed to show internal components, support structures, and attachments.
Figure 5A:
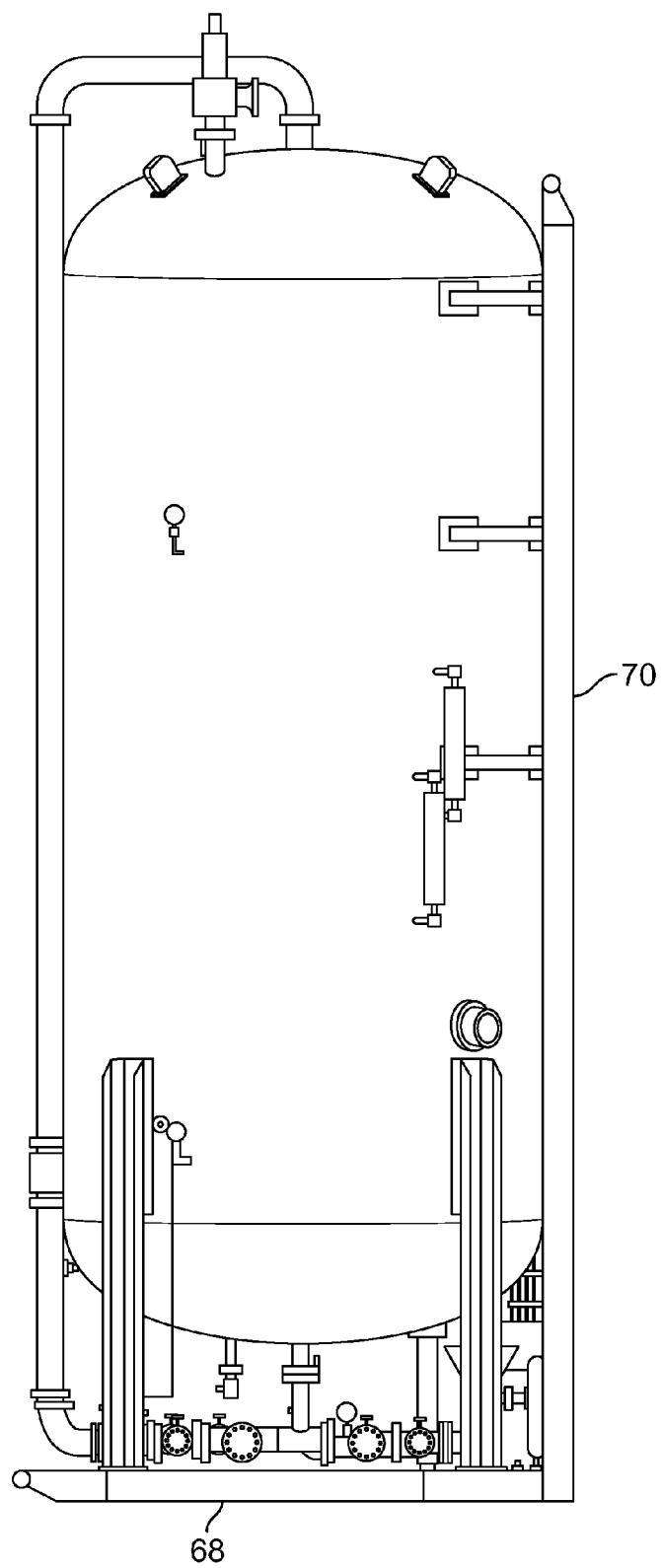
FIG. 5A shows a second side view of an embodiment of the closed vertical separator of the present invention.
Figure 5B:
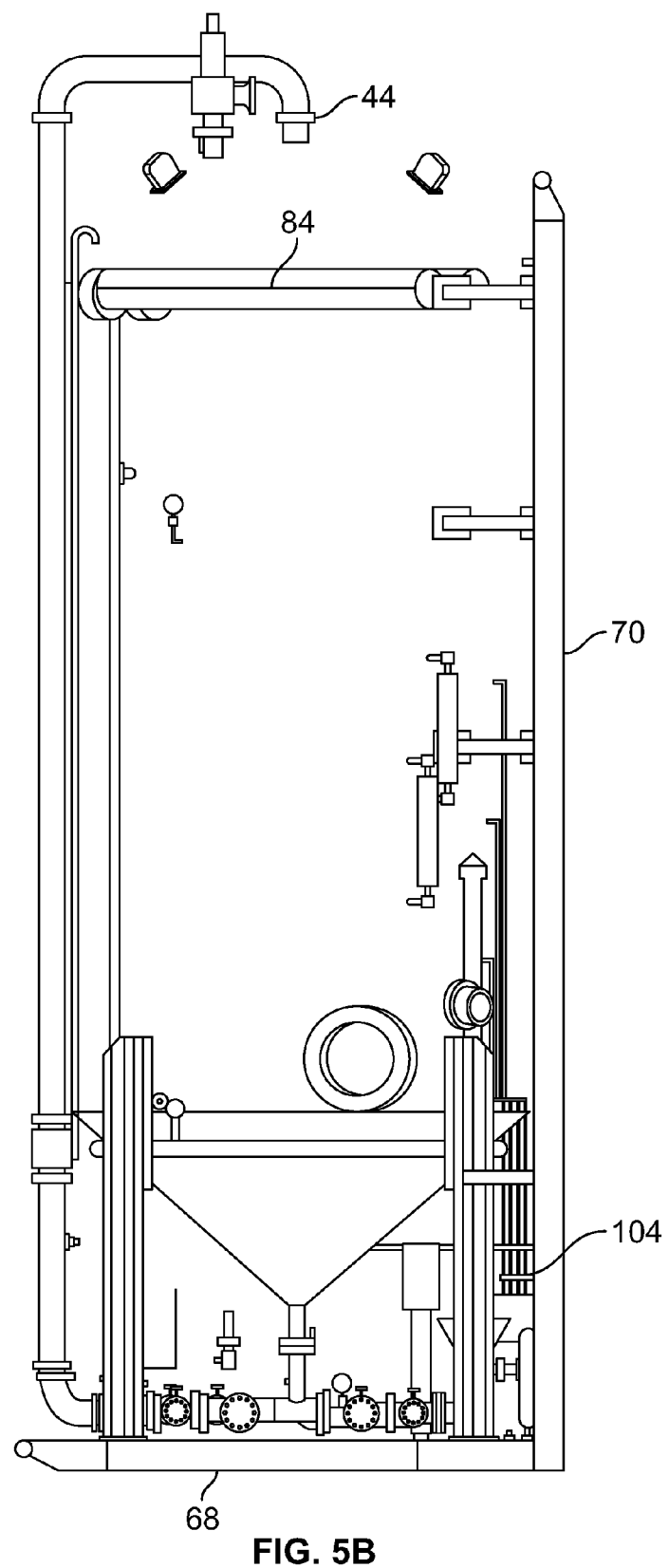
FIG. 5B shows the view of FIG. 5A, but with the vessel removed to show internal components, support structures, and attachments.
Figure 6A:
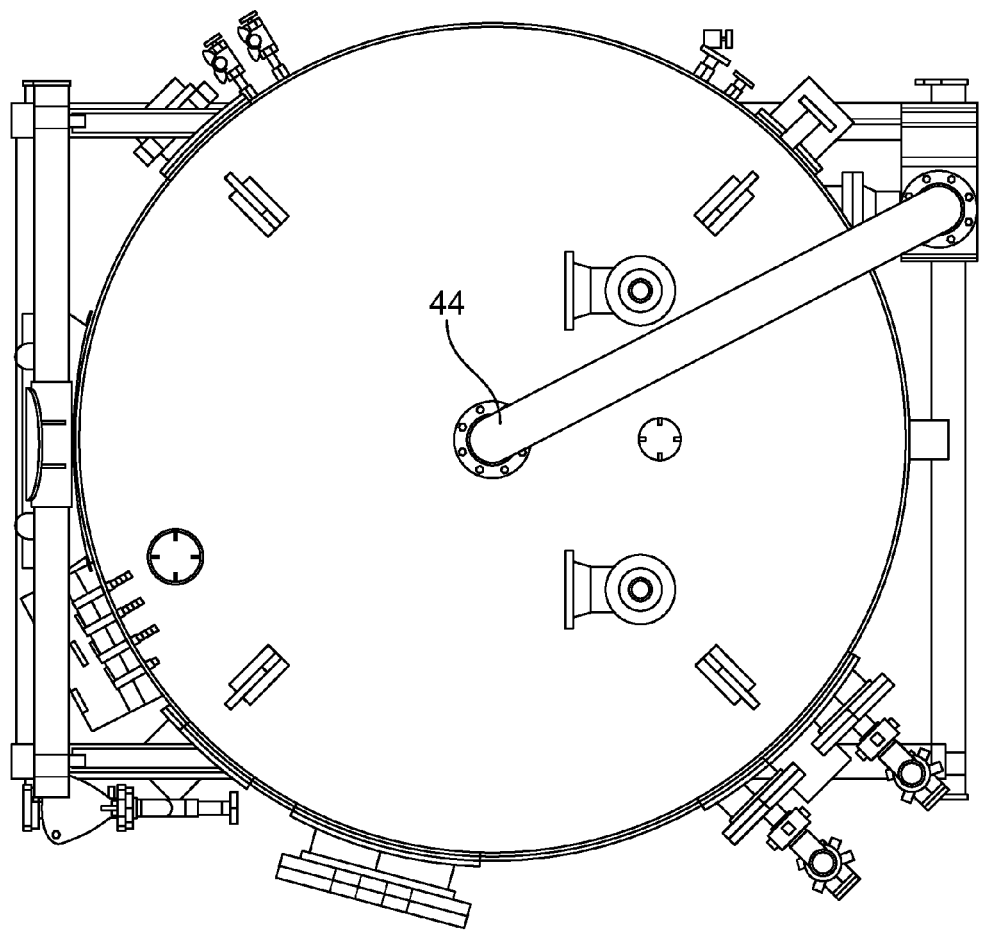
FIG. 6A shows a top view of an embodiment of the closed vertical separator of the present invention.
Figure 6B:
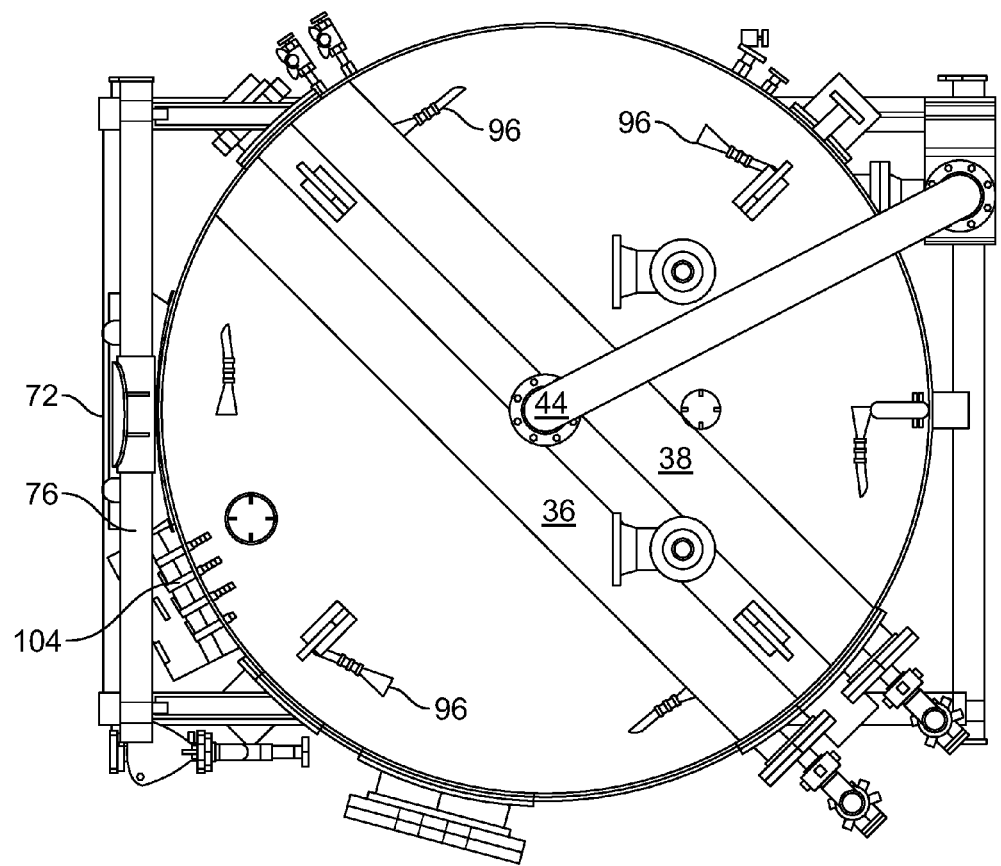
FIG. 6B shows the view of FIG. 6A, but with the vessel removed to show internal components, support structures, and attachments.
Figure 7A:
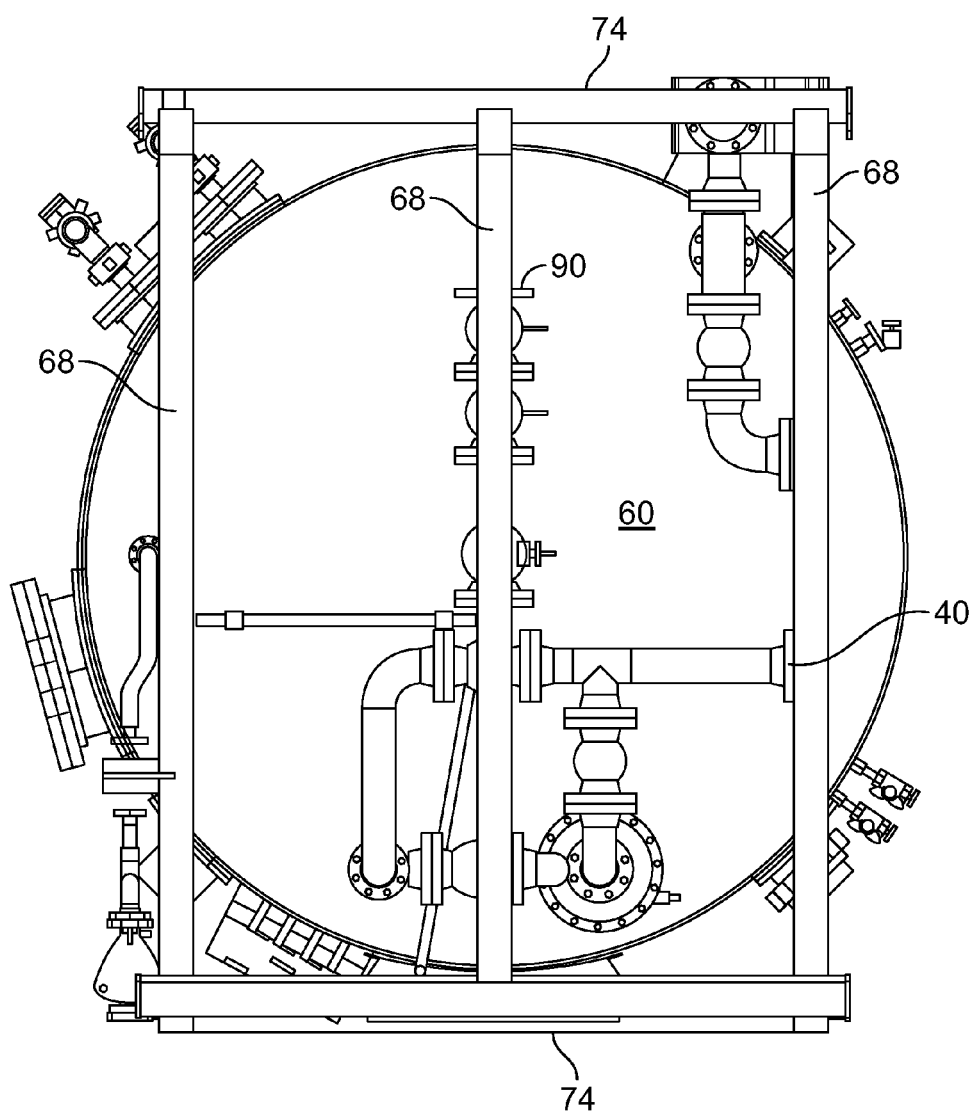
FIG. 7A shows a bottom view of an embodiment of the closed vertical separator of the present invention.
Figure 7B:
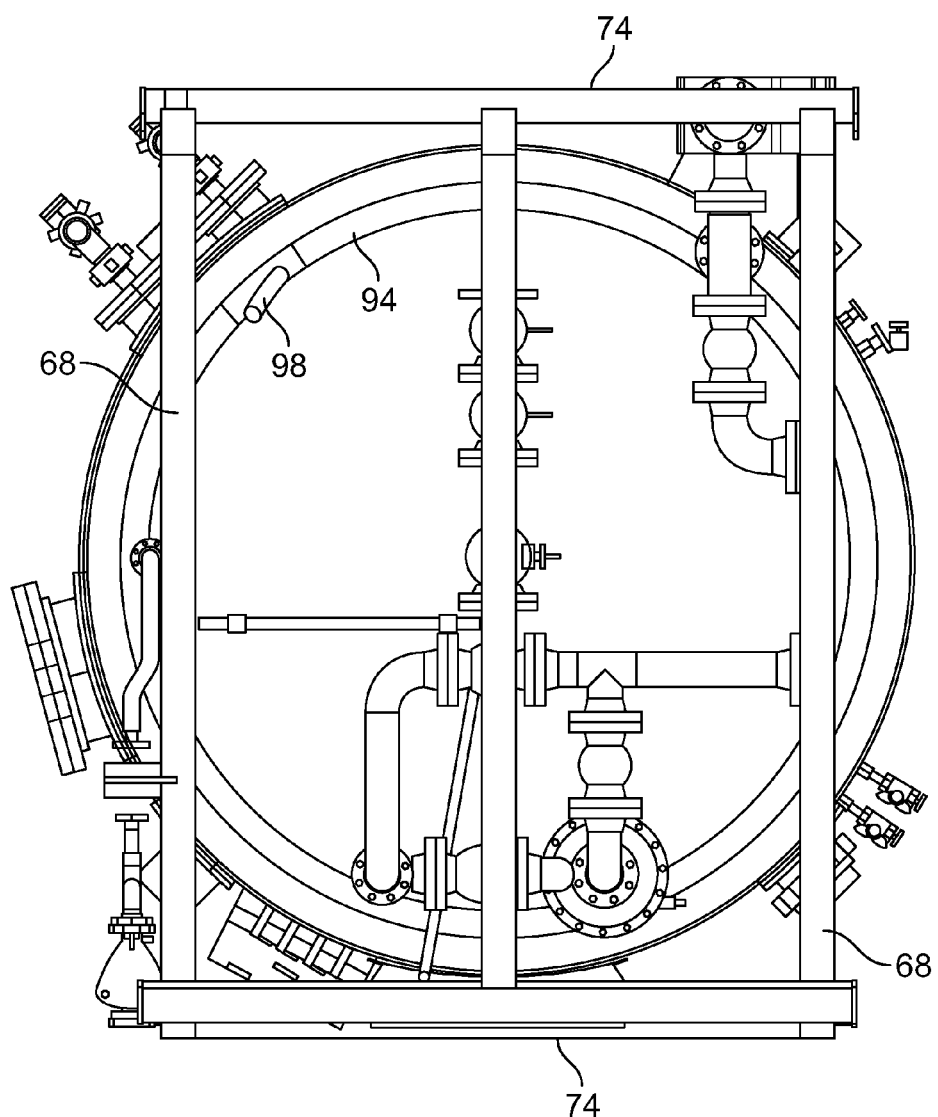
FIG. 7B shows the view of FIG. 7A, but with the vessel removed to show internal components, support structures, and attachments.

Referring now to the figures, FIG. 1 schematically shows a temporary hydrocarbon well production system. In this system, flow originates from hydrocarbon well 10 which may flow through a data header 12, which is a short sub connected on the upstream side of a choke manifold to provide, optionally, an additional pressure gauge, thermowells, and sampling or injection ports. The data header 12 allows connection of pressure and temperature monitoring equipment, as well as sampling or injection equipment. Flow from wellhead 10 may continue through an emergency shutdown valve 14 through production line 16 to sand separator 18. Sand separator (also known as a sand trap) 18 receives flow from production line 16. Sand separator 18 has a fluid outlet 20 and a solids outlet which is attached to sand dump line 22. The fluid outlet 20 is connected to a choke manifold 24 which is a system of valves and chokes for controlling the flow from the well 10. Flow from choke manifold 24 is thereafter routed through choke outlet 26. The flow through choke outlet 26, by the appropriate valving, may be directed into test separator 28, which will return liquids back into the fluid outlet 20 and separated gas into the gas discharge system. Both choke outlet 26 and sand dump line 22 are connected to closed separator 30. Closed separator 30 is a largely self-contained unit which allows an operator to make the necessary connections and obtain a unit which receives a solids-laden fluid, separates the gas, liquids and solids and has a self-contained cleaning system. Closed separator 30 is packaged to be compact unit, having a relatively small footprint, and to be transportable by truck, rail, or boat. Closed separator 30 contains the vapors and volatile organic compounds contained within the received fluids and discharges these substances for further processing and incineration or sales.

Closed separator 30 receives flow from choked outlet 26 through a first inlet 32. Closed separator 30 receives flow from sand dump line 22 through a second inlet 34. Closed separator 30 comprises a first flow diffuser 36 connected to the first inlet 32 and a second flow diffuser 38 connected to the second inlet 34. Both first flow diffuser 36 and second flow diffuser 38 are fully contained within closed separator 30. Both diffusers 36, 38 reduce flow velocity, and generally direct flow downwardly in closed separator 30. Liquid dump line 40 discharges liquids from closed separator 30 into at least one of closed tanks 42. A vapor discharge line 44 discharges gas and vapor from the closed separator 30 into a gas gathering system which may include a vapor recovery unit 46. Vapor recovery unit 46 may also gather free gas and vapor from closed tanks 42. Gas and vapor collected into the gas gathering system may be processed through a flare scrubber 48 for collection of any liquids, and the free gas and vapors incinerated through flare 50 or further collected into a gas collection system for processing and sale or field use.

The system may also include a liquid circulation system which cleans separator 30. Liquids from closed tanks 42 may be filtered through filter 52 and pressurized by pump 54 and circulated through closed separator 30 as described below from cleaning collected solids from the separator.

It is to be appreciated that the temporary hydrocarbon well production system shown schematically in FIG. 1 and described above is a closed system in which vapors and volatile organic compounds are contained within the system and safely processed.

Closed separator 30 is a critical component of the temporary hydrocarbon well production system. FIGS. 2A through 10 show various components of an embodiment of the closed separator 30, which are describe hereafter.

As shown in FIGS. 2A through 10, closed separator 30 is configured as a vertical vessel. An appropriate pressure vessel 60 for the separator has approximately a ten foot outside diameter, and approximately a twenty foot seam-to-seam length with a cone bottom. Pressure vessel 60 is mounted within a transportable skid frame 62, shown in detail in FIG. 9. Transportable skid frame 62 has central vessel supports 64 and lateral vessel supports 66, which cradle pressure vessel 60. Skid frame 62 is generally formed by base structural members 68 and longitudinal structural members 70. These structural members may be fabricated from W8×21 beams. The transportable skid frame 62 has a lifting eye 72 and may be adapted for attachment to a dolly or the structural members may be equipped with lifting lugs and heavy duty casters to facilitate loading of the skid onto a flat bed truck, trailer or boat deck. Base structural members 68 are attached to cross members 74 which may be fabricated from four inch diameter scheduled 80 pipe. Longitudinal structural members 70 are attached to a common cross-member 74 with the base structural members 68 and a top cross-member 76 which may be fabricated from five inch diameter schedule 80 pipe. Longitudinal structural members 70 are also supported by brace members 78, which may be steel square tubing such as a 3×3×¼ material.

Figure 8A:
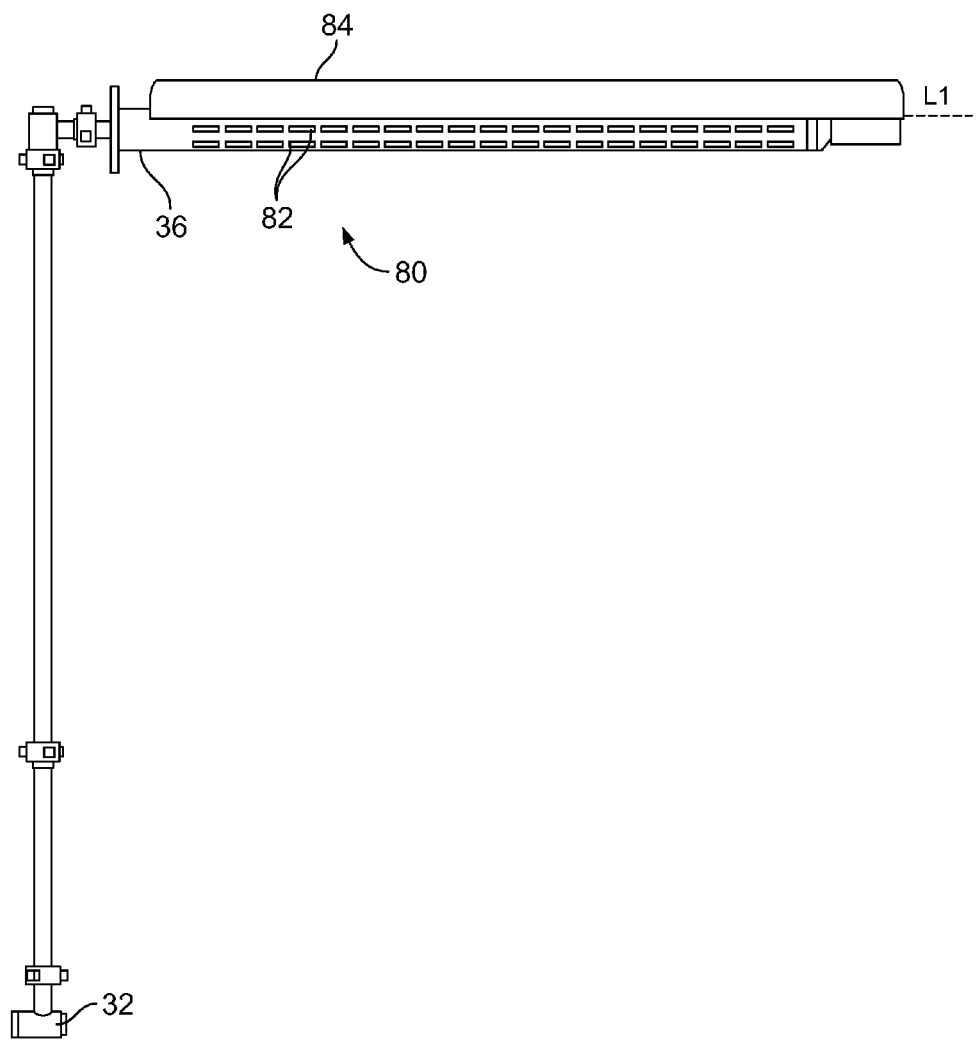
FIGS. 8A-8D show a detailed view of an embodiment of a diffuser of the vessel of the present invention.
Figure 8B:
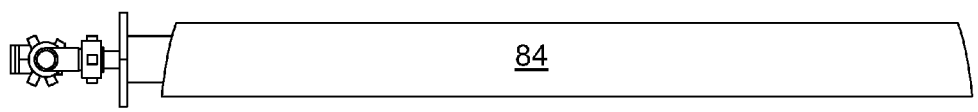
Figure 8C:
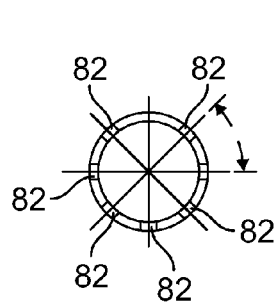
Figure 8D:
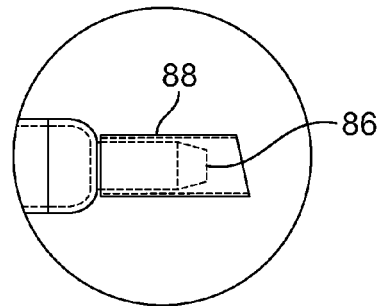
Figure 9:
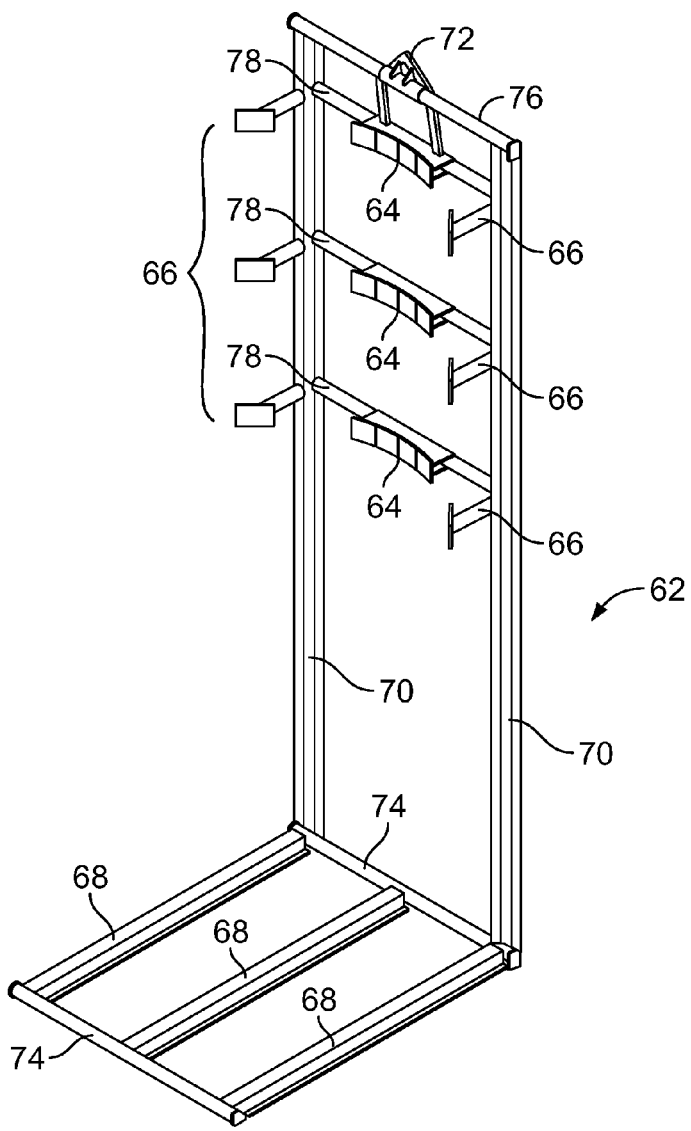
FIG. 9 shows a detailed view of an embodiment of a frame structure which may be utilized for supporting and transporting a vessel of the present invention.
Figure 10:
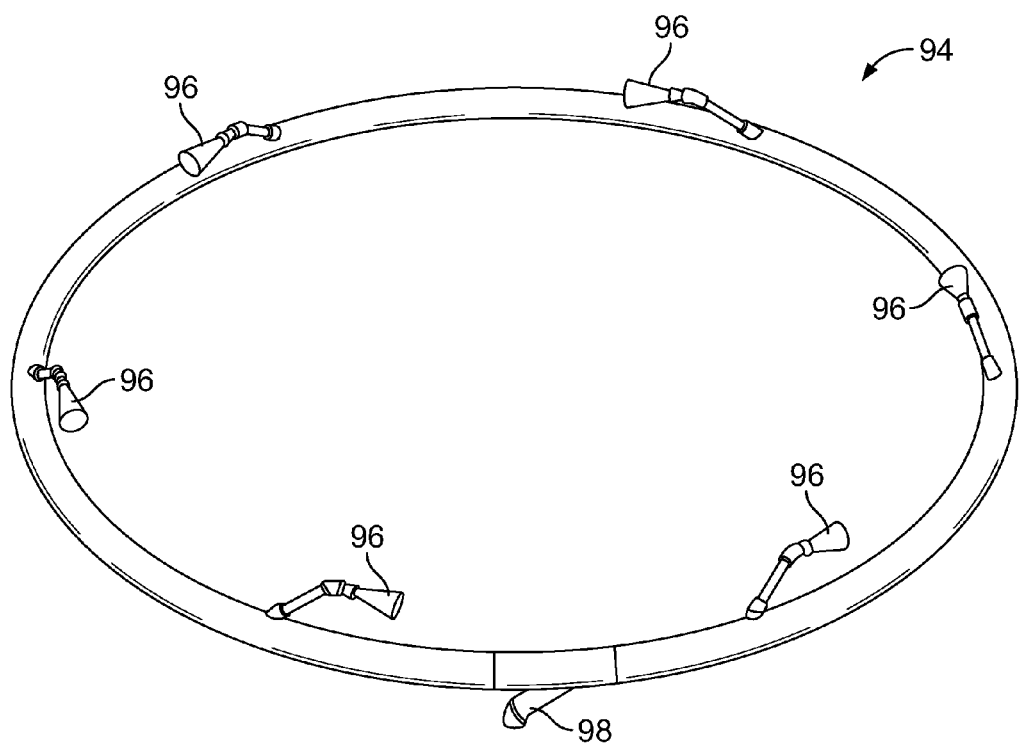
FIG. 10 shows a view of an internal vessel cleaning manifold which may be utilized in embodiments of the present invention.

Inflow to closed separator 30 is provided through first inlet 32, which receives flow from choked outlet 26, and second inlet 34, which receives flow from sand dump line 22. The first inlet 32 and the second inlet 34 flow independently to flow diffusers 36, 38, which are enclosed within closed separator 30, and typically located in the upper portion of vessel 60. Flow diffusers 36, 38 may be disposed in a horizontal and parallel configuration within vessel 60. As shown in the figures, the diffusers 36, 38 may span nearly the entire diameter of vessel 60, and may range from 75 percent to 95 percent of the inside diameter of the vessel 60. FIGS. 8A through 8D provide detail of diffuser 36, with it understood that diffuser 38 may be identical to diffuser 36. As shown in FIG. 8A, diffusers 36 comprises a plurality of slot banks 80, a slot bank defined as a group of slots 82 located at approximately the same axial position on a diffuser 38. Slots 82 may have a long axis aligned along the long axis $L_1$ of the diffuser 36. As indicated in FIG. 8c, a single slot bank 80 may comprise 7 slots 80, with the slots spaced at 45 degree intervals from each other. It is to be noticed that there are no slots directly facing the top of the vessel 60. If should be further noticed that the diffusers 36, 38 may be used in connection with a flow shield 84. Flow shield 84 diverts fluid flow downwardly away from the top of the vessel to reduce the potential for erosional damage which may otherwise occur from the high velocity flow of solids-laden fluid. Diffusers 36, 38 may terminate with solid round plug 86 and a relatively short length of pipe 88 which has a radiused end. The termination formed by round plug 86 and radiused pipe length 88 facilitates alignment of the diffusers during construction and provides support, with the termination abutting the inside wall of the vessel 60 opposite the side where flow enters the diffusers 36, 38.

Solids exit vessel 60 through sand discharge 90, which is located at the bottom of internal cone bottom 92 of the vessel 60. Internal cone bottom may be fabricated from rolled ⅜ inch SA-38 plate, and form an angle of approximately 40 degrees from horizontal, and form an opening at the bottom of the cone, which may be 4 to 5 inches in diameter. The cone bottom 92 will typically have a height of about four feet. Sand discharge 90 may be connected at an opening of the cone bottom 92. Washing sand and solids from the vessel 60 is facilitated by the use of cleaning manifold 94, which is shown in greater detail in FIG. 10. Cleaning manifold 94 is disposed circumferentially around cone bottom 94, toward the upper end of the cone bottom. Located about the cleaning manifold are a plurality of spray nozzles 96 which are positioned to spray in a generally tangential direction about the cone bottom 94. Cleaning manifold 94 receives pressurized liquid flow from line 98. Liquid for cleaning the vessel 60 is cleaned through filter 52 and pressurized by pump 54, which are contained within the skid.

Gas, vapor, volatile organic compounds, etc., are discharged through vapor discharge line 44 which takes flow from the top of vessel 60. Vapor discharge line 44 may be equipped with a gas meter 100. As described above, vapor discharge line 44 is connected to vapor recovery unit 46.

Liquids are discharged from vessel 60 through liquid dump line 40 into at least one of closed tanks 42. Flow through dump line 40 is controlled by dump valve 102. Liquid and solids samples from various levels in vessel 60 may be taken through sample cocks 104. Manway 106 provides access to vessel internals when required for maintenance.

While the above is a description of various embodiments of the present invention, further modifications may be employed without departing from the spirit and scope of the present invention. Thus the scope of the invention should not be limited according to these factors, but according to the following appended claims.

I claim:

1. A temporary hydrocarbon well production system comprising:
   a hydrocarbon well;
   a production line connected to the hydrocarbon well;
   a sand separator connected to the production line, the sand separator having a fluid outlet connected to a choke manifold and a solids outlet connected to a sand dump line;
   a closed separator having a first inlet receiving fluid flow from the choke manifold and a second inlet receiving flow directly from the sand dump line;
   a first flow diffuser connected to the first inlet and a second flow diffuser connected to the second inlet, the first flow diffuser and second flow diffuser contained within the closed separator;
   a liquid dump line discharging liquids from the closed separator, the liquid dump line attached to at least one closed tank; and
   a vapor discharge line discharging gas and vapor from the closed separator, the vapor discharge line attached to a vapor recovery unit.

2. The system of claim 1 further comprising a test separator disposed between the hydrocarbon well and the closed separator.

3. The system of claim 1 wherein the closed separator is a cylindrical vertical separator having an inside diameter D and height H, and a top and a bottom.

4. The system of claim 3 wherein the closed separator has a first axis defined by the inside diameter of the closed separator and a second axis defined by the height of the closed separator.

5. The system of claim 4 wherein the first flow diffuser and the second flow diffuser are mounted in parallel.

6. The system of claim 5 wherein the first flow diffuser and the second flow diffuser are mounted generally parallel to the first axis and perpendicular to the second axis.

7. The system of claim 6 wherein the first flow diffuser and the second flow diffuser each have a length ranging from 75 percent to 95 percent of diameter D.

8. The system of claim 3 wherein the first diffuser and the second diffuser each comprise a pipe having a plurality of slot banks.

9. The system of claim 8 wherein the first diffuser and the second diffuser each comprise a top portion oriented toward the top of the closed separator.

10. The system of claim 9 where each slot bank comprises a plurality of slots, each slot having a long axis aligned along a first axis defined by the inside diameter of the closed separator.

11. The system of claim 10 wherein each slot bank comprises 7 slots, the slots spaced at 45 degree intervals from each other, with an upper portion directly facing the top of the closed separator, the upper portion comprising no slots.

12. The system of claim 9 wherein the first diffuser and the second diffuser each comprise a shield member extending substantially along the top portion.

13. The system of claim 1 wherein the closed separator is mounted on a transportable skid frame.

14. The system of claim 1 wherein the closed separator comprises a cone bottom.

15. The system of claim 14 further comprising a cleaning manifold having a plurality of spray nozzles disposed circumferentially around the cone bottom.

16. A closed vertical separator for use in a temporary production system for an oil well, the temporary production system comprising a production line connected to the oil well, a sand separator connected to the production line, the sand separator having a fluid outlet connected to a choke manifold and a solids outlet connected to a sand dump line, the closed vertical separator comprising:
- a diameter D and height H, and a top and a bottom;
- a first axis defined by the diameter of the closed vertical separator and a second axis defined by the height of the closed vertical separator;
- a first inlet receiving fluid flow from the choke manifold and a second inlet receiving flow directly from the sand dump line, a first flow diffuser connected to the first inlet and a second flow diffuser connected to the second inlet, the first flow diffuser and second flow diffuser contained within the closed separator;
- wherein the first flow diffuser and the second flow diffuser are mounted in parallel and mounted perpendicular to the second axis;
- the first diffuser and the second diffuser each comprise a pipe having a plurality of slot banks, each slot bank comprising a plurality of slots, each slot having a long axis aligned along the first axis;
- a liquid dump line discharging liquids to at least one closed tank; and
- a vapor discharge line discharging gas and vapor to a vapor recovery unit.

17. The vertical separator of claim 16 wherein the first flow diffuser and the second flow diffuser each have a length ranging from 75 percent to 95 percent of the diameter D.

18. The vertical separator of claim 16 wherein each slot bank comprises 7 slots, the slots spaced at 45 degree intervals from each other, with no slots directly facing the top of the vertical separator.

19. The system of claim 18 wherein the first diffuser and the second diffuser each comprise a top portion oriented toward the top of the vertical separator.

20. The system of claim 19 wherein the first diffuser and the second diffuser each comprise a shield member extending substantially along the top portion.

21. The system of claim 16 wherein the closed vertical separator comprises a cone bottom.

22. The system of claim 21 further comprising a cleaning manifold having a plurality of spray nozzles disposed circumferentially around the cone bottom.

* * * * *